Jan. 15, 1963 M. ZIMMER 3,073,231
CAMERAS HAVING A DEVICE FOR SECURING A DETACHABLE RELEASE CABLE
Filed May 19, 1959 2 Sheets-Sheet 1

INVENTOR
MICHEL ZIMMER
BY
ATTORNEY

Jan. 15, 1963    M. ZIMMER    3,073,231
CAMERAS HAVING A DEVICE FOR SECURING A DETACHABLE RELEASE CABLE
Filed May 19, 1959    2 Sheets-Sheet 2

INVENTOR
MICHEL ZIMMER
BY
ATTORNEY

United States Patent Office 3,073,231
Patented Jan. 15, 1963

---

3,073,231
CAMERAS HAVING A DEVICE FOR SECURING A DETACHABLE RELEASE CABLE
Michel Zimmer, Yverdon, Switzerland, assignor to Paillard S.A., Sainte-Croix, Switzerland, a corporation of Switzerland
Filed May 19, 1959, Ser. No. 814,184
Claims priority, application Switzerland June 4, 1958
4 Claims. (Cl. 95—53)

Known cameras are in general provided with a device for the securing of a detachable release cable. This device comprises a cable access opening, in which is secured the end of said cable, and a release pusher located in the bore extending from said opening and which provokes the setting in operation of the apparatus.

In the majority of cameras the cable access opening remains open in the absence of the cable, so that foreign bodies, grains of dust, tobacco and so forth, may easily cause an obstruction, particularly when the camera is placed in the pocket of a garment. In order to obviate this disadvantage, it has been proposed to place a plate slidably or pivotally mounted on the framework of the camera, which permits of closing the opening of the seating when the cable is detached from the apparatus.

This arrangement does not always give entire satisfaction, principally by reason of the fact that this plate must be advanced or withdrawn by the operator, which necessitates a supplementary operation. Further, a plate provided on the outside of the casing, may easily attach itself to rough portions, and when such a plate is to be placed into the framework it is difficult to find a place therefor on a camera of reduced size.

The present invention has for its object to provide an improved camera in which the above-mentioned disadvantages are eliminated. For this purpose, in the camera forming the subject of the invention, the release pusher is shaped in such a manner that its front end closes the mouth opening of the said bore or socket adapted to receive the end of the cable, for preventing the penetration of foreign bodies into said seating, and the release mechanism has an idle stroke permitting of the mounting of the cable after the pusher has been pushed axially against the action of yielding means which maintain it in an advanced position in the absence of the cable.

Two forms of construction of the camera, subject of the invention, are shown by way of example, in the accompanying drawings, wherein.

The camera shown in FIGS. 1 to 6 shows a device which while normally acting as a closure for the cable release access opening, when the cable release is detached from the camera, nevertheless also serves to detachably hold the end of the release cable when it is attached to the camera for use. In this embodiment of the invention, the device comprises an internally threaded bore 1 in the camera casing, for example, and whose outer end is adapted to detachably receive the end of the cable, and whose inner end is intended to receive a slidable spring-biased, preferably cylindrical, slidable stopper 2.

Figure 3:
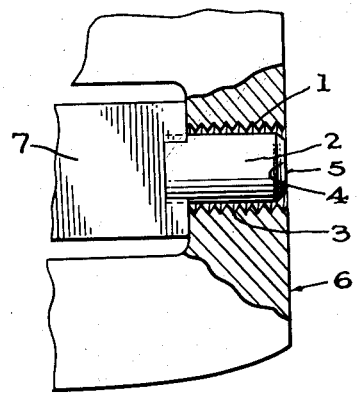
FIGURE 3 is a sectional view on a larger scale showing the bore adapted to receive the end of the cable.
Figure 4:
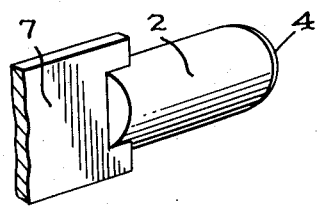
FIGURE 4 is a perspective view of a member whose end is intended to close said bore.

As shown in FIGURE 3, the bore 1, drilled into the framework of the camera is internally threaded at 3 to receive the mating threaded portion of the cable.

The pusher head 2 is capable of sliding in said bore and has a beveled front edge 4 and its front face 5 located substantially in the plane 6 in the mouth of the bore, normally to close the same and prevent entrance of foreign material.

Figure 1:
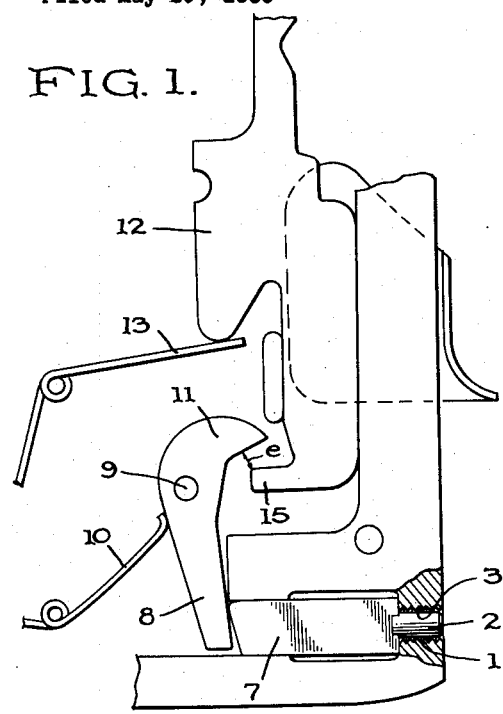
FIGS. 1 and 2 are partial views of control members of release mechanism of a first form of construction of the camera, FIG. 1 showing the camera in the absence of the release cable, and FIG. 2 when the cable has been mounted.

The head 2 is carried by a flat metallic plate 7 (FIG. 4) and is maintained in advanced position by the tail portion 8 of a bellcrank lever pivoted at 9 and having its arm 11 normally maintained in the position shown in FIGURE 1 by a leaf spring 10.

The arm 11 of the lever is adapted to actuate film release member 12 which constitutes the control means for the film driving mechanism of the camera, not shown because it is conventional. This release member 12 is linearly slidable and urged to locking position by spring 13 which tends to maintain it in the uppermost position shown FIGURE 1 which is the position in which the film control mechanism is at rest, or, in its stopped condition. Between the arm 11 of the lever 8 and the offset finger 15 of the member 12, a space or interval $e$ is provided to determine the idle stroke of the release mechanism, which would occur, for example, when the end of a cable is first inserted in the open end of a bore to connect the remote cable control device with the camera.

Figure 2:
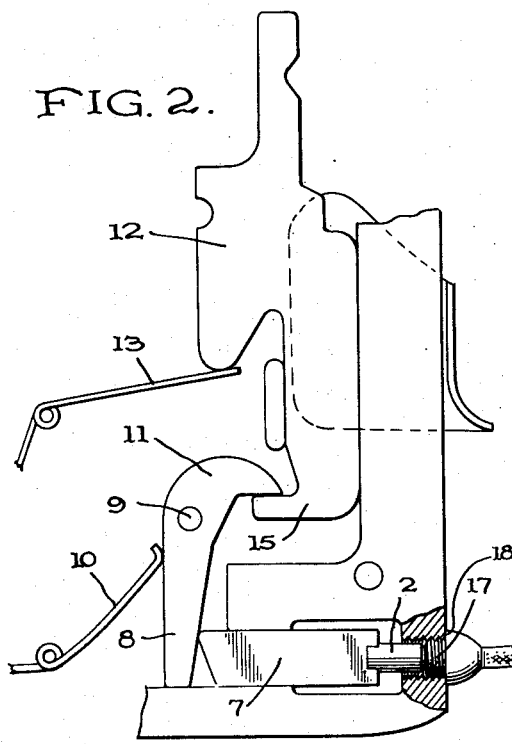
Figure 5:
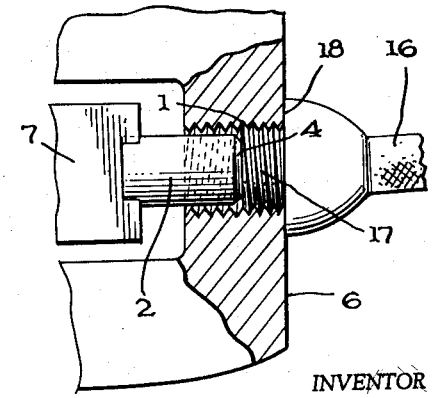
FIGURE 5 is a section similar to FIGURE 3, but showing the end of the detachable cable in engaging position with said bore.

By reason of this idle stroke $e$, it is possible to secure in the bore 1 the end of a remote actuating cable such as that shown partly at 16 in FIGS. 2 and 5, which comprises a threaded connection 17 having a shoulder 18 adapted to bear against the framework of the camera when the cable connection is screwed at the bottom in the bore 1.

The axial movement of the pusher head or plug 2 which results from placing of the cable in position does not provoke any movement of the locking member 12 because of space $e$ but places the mechanism ready for operation, as shown in FIG. 2.

Figure 6:
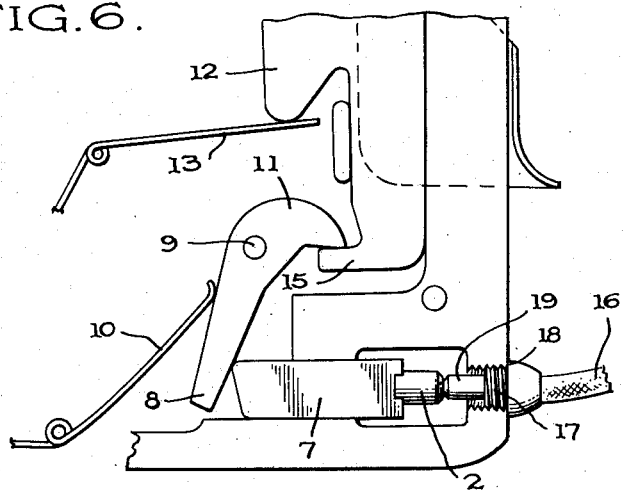
FIG. 6 is a view similar to FIG. 2, in another position of the mechanism.

On the contrary, when the pusher head 2 follows its movement towards the left by reason of the movement of a movable internal flexible Bowden wire or the like 19 of the cable 16 (FIG. 6), the lever 8 is caused to act on the member 12 which is then lowered into its lower position shown in FIG. 6 which corresponds to the release of the mechanism driving the camera.

When the cable 16 is detached, the pusher head 2 automatically resumes its advanced position shown in FIGS. 1 and 3, in which it practically closes the opening of the seating 1, thus preventing the penetration of foreign bodies into said latter.

Figure 7:
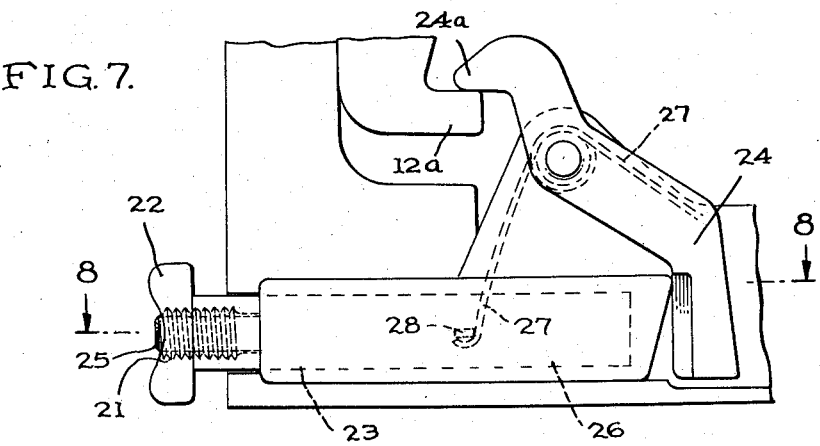
FIG. 7 is a partial view of the release mechanism of a second form of construction of the camera.
Figure 8:
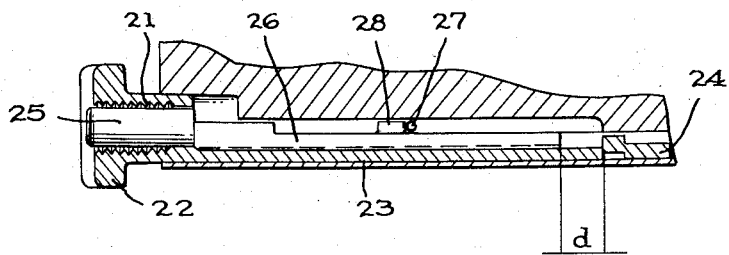
FIG. 8 is a section on the line 8—8 of FIG. 7.

In the second form of construction shown in FIGURE 7 and 8, a threaded bore 21 is drilled in the release knob 22 which constitutes a casing to slidably receive the end of the remote operation cable. This knob is carried by the outer end of a first slide 23 whose inner end cooperates with an actuating lever 24 having an arm 24a engaging the lower offset end of the slide member 12a.

The bore 21 is normally and yieldably closed by head or stopper plug 25, which, as in the case of head of FIGS. 1–6, is mounted on the front end of the second or pusher slide 26. This slide is shorter than the first slide 23 carrying knob 22 but its rear end may also act on the actuating lever 24 after an idle movement of distance equivalent to the space $d$, FIG. 8. This a angement permits attaching of the cable to the knob without moving the lever 24 until it is desired to do so by remote control.

A spring 27 co-operating with a peg 28 secured to the slide 26 tends to maintain said latter in its position shown in FIGS. 7 and 8, in which the opening of the bore 21 is closed by the pusher 25. The mounting of a releasable cable has the effect of repelling the pusher 25 into the interior of the knob 22 without moving the lever 24.

It is to be observed that the placing of the cable in position, in the two cameras described, does not necessitate any particular operation and that the bore adapted to receive the connection of cable is re-closed automatically when removing said latter.

In modifications, it is also possible to provide securing members for the cable, other than screw threads. In particular, it is possible to use a bayonet joint. It is also to be mentioned that the cable has no particularity and that for this reason it is possible, without inconvenience, to use cables of normal construction for actuating these cameras from a distance.

I claim:
1. In a photographic apparatus intended for use with a remote control cable having an unthreaded actuating portion and a threaded connector portion, a casing having an internally threaded opening for receiving the threaded connector portion of the cable, a film release mechanism, a lever medially pivoted in the casing and having an arm for cooperation with the release mechanism and also having a tail portion, a spring engaging said tail portion to bias the arm away from the film release mechanism and leave a gap for idle movement, and pusher means freely slidable axially under the influence of said tail portion in said internally threaded opening and normally maintaining its outer end in a position to flushly close said internally threaded opening until the threaded connector portion of the cable forces the pusher means inwardly to close the gap.

2. In a photographic apparatus according to claim 1, wherein the pusher means includes a cylindrical portion slidable in said internally threaded opening of the casing and said cylindrical portion is connected with a blade engaging the tail of the lever opposite the arm which engages the release mechanism.

3. In a photographic apparatus for use with a remote control cable having an unthreaded actuating portion and a connector portion having securing means,
a release member,
actuating means for said release member,
a casing,
an opening in said casing having securing means and adapted to receive the mating unthreaded actuating portion of said remote cable and to also receive the securing means of the connector portion,
pusher means in said casing for engaging said actuating means,
said pusher means including a pusher head filling said opening and freely slidable therein,
spring means urging said pusher means to hold it in a first position so that the outer face of the said pusher head is substantially flush with and fills the outer end of said opening when said remote cable is disconnected from said casing,
said release member, actuating means, and pusher means comprising interacting elements positioned and arranged to provide a gap between two of said elements when said pusher means is in said first position, whereby,
initial movement of said pusher head to a second position after insertion of the unthreaded actuating portion of the cable in said casing closes said gap, and further movement of the pusher head by the actuating portion of the cable, activates said actuating means and release member.

4. In a photographic apparatus according to claim 3, wherein said casing is in the form of a knob and has a first slide engaging said actuating means,
said pusher means including a second slide which, when urged to said first position by said spring means, is spaced from said actuating means to provide said gap, whereby said release member may be activated either by displacing said knob and said first slide to activate said actuating means or by inserting the actuating portion of the cable in said casing with subsequent movement of the actuating portion against said pusher head.

References Cited in the file of this patent
FOREIGN PATENTS

| 2,383 | Great Britain | 1904 |
| 643,215 | Great Britain | 1950 |